United States Patent [19]

Oomura et al.

[11] Patent Number: 5,434,219

[45] Date of Patent: * Jul. 18, 1995

[54] THERMOPLASTIC RESIN COMPOSITION

[75] Inventors: Katsuro Oomura, Kameyama; Tateki Furuyama, Yokkaichi; Kazuhiko Yamamoto, Kuwana; Toshihiro Shimamura, Kameyama; Yoshinobu Suzuki, Suzuka, all of Japan

[73] Assignee: Japan Synthetic Rubber Co., Ltd., Tokyo, Japan

[*] Notice: The portion of the term of this patent subsequent to Apr. 28, 2009 has been disclaimed.

[21] Appl. No.: 194,123

[22] Filed: Feb. 9, 1994

Related U.S. Application Data

[60] Division of Ser. No. 16,182, Feb. 11, 1993, Pat. No. 5,306,778, which is a continuation of Ser. No. 782,733, Oct. 28, 1991, abandoned, which is a continuation of Ser. No. 396,660, Aug. 22, 1989, abandoned.

[30] Foreign Application Priority Data

Aug. 24, 1988 [JP] Japan .................................. 63-209827
May 18, 1989 [JP] Japan .................................. 1-124964

[51] Int. Cl.⁶ .............................................. C08L 51/04
[52] U.S. Cl. ........................................ 525/84; 525/64; 525/66; 525/68
[58] Field of Search ......................... 525/64, 66, 68, 84

[56] References Cited

U.S. PATENT DOCUMENTS

| | | | |
|---|---|---|---|
| 4,657,971 | 4/1987 | Shibata et al. | 525/57 |
| 4,972,020 | 11/1990 | Shiraki et al. | 525/90 |
| 5,109,069 | 4/1992 | Shibata et al. | 525/240 |
| 5,191,024 | 3/1993 | Shibata et al. | 525/314 |

FOREIGN PATENT DOCUMENTS 994924 6/1965 United Kingdom.
1180085 2/1970 United Kingdom.

*Primary Examiner*—Vasu S. Jagannathan
*Attorney, Agent, or Firm*—Oblon, Spivak, McClelland, Maier & Neustadt

[57] ABSTRACT

A thermoplastic resin composition comprising: (I) a rubber-modified thermoplastic resin, and (II) a transparent thermoplastic resin, a thermoplastic elastomer or combination thereof, provided that said resin (I) is excluded from component (II), wherein the rubber-modified thermoplastic resin (I) is a resin prepared by polymerizing (B) 30–100% by weight of at least one member selected from the group consisting of an aromatic alkenyl compound monomer and an alkyl (meth)acrylate monomer and (C) 70–0% by weight of at least one other monomeric compound copolymerizable therewith, in the presence of 5–45% by weight of (A) a hydrogenated diene copolymer of component (I) obtained by hydrogenating a diene copolymer comprising a random copolymer of 50% by weight or more of at least one conjugated diene and 50% by weight or less of an alkenyl aromatic compound until at least 70% by weight of the olefinic unsaturation of the diene copolymer is hydrogenated.

20 Claims, No Drawings

THERMOPLASTIC RESIN COMPOSITION

This is a division of application Ser. No. 08/016,182, filed on Feb. 11, 1993, now U.S. Pat. No. 5,306,778, which is a continuation of Ser No. 07/782,733, filed Oct. 28, 1991, which is a continuation of Ser. No. 07/396,660, filed Aug. 22, 1989, both abandoned.

This invention relates to a process for producing a rubber-modified thermoplastic resin superior in appearance of molded article, impact resistance and weather resistance. More particularly, this invention relates to a process for producing a rubber-modified thermoplastic resin greatly improved in appearance (tintability) of molded article, falling ball impact strength at low temperatures and anisotropy in strength and superior in weather resistance, fatigue characteristics and moldability, which process comprises graft-polymerizing at least one monomer selected from aromatic alkenyl compounds and (meth)acrylic acid ester compounds in the presence of a hydrogenation product of a copolymer composed of a conjugated diene and an alkenyl aromatic compound.

It is known that graft copolymers (AES resins) obtained by graft-polymerizing styrene, acrylonitrile, etc. on an EPM or EPDM (rubber component) containing substantially no unsaturation in the main chain, have high resistance to ultraviolet light, oxygen and ozone as compared with ABS resins in which a conjugated diene rubber is used and accordingly have excellent weather resistance.

The AES resins, however, have the following problems:

(1) Poor in tintability. Rubber-modified resins typified by AES resins are thought to have poor tintability as compared with uniform resins. According to the investigation by the present inventors, the AES resins belonging to the rubber-modified resins, as compared with the ABS resins, are insufficient in clearness and depth when tinted to a brilliant color or a deep color, in particular; in order to tint an AES resin so as to have about the same color as an ABS resin, a larger amount of a coloring material has been required.

(2) Poor in impact resistance at low temperatures. The AES resins are inferior to the ABS resins in low-temperature properties, especially impact resistance at low temperatures. Therefore, the AES resins have very limited application fields, in spite of the great advantage of excellent weather resistance. In order to improve the AES resins in impact resistance at low temperatures, it has been tried to, for example, blend an AES resin with other polymers; however, it is difficult to improve the AES resin in impact resistance at low temperatures while retaining the weather resistance.

(3) High in anisotropy in strength. The AES resins have high anisotropy in strength as compared with the ABS resins and tend to have a large difference in strength between the extrusion direction and the transverse direction. Therefore, when processed according to the same method as for the ABS resins, the AES resins have anisotropy in strength, and accordingly the change of molding conditions becomes necessary. For example, it becomes necessary to increase the molding temperature and decrease the extrusion speed in extrusion-molding, resulting in a reduction of economy in some cases.

(4) Insufficient in fatigue characteristics. The AES resins are insufficient in fatigue characteristics when molded, fitted and subjected to, for example, repeated stressing, and therefore have limited applications when used as a part.

In general, polymethyl methacrylate resin or copolymer resin of methyl methacrylate and other comonomer is superior in transparency, gloss, weather resistance, etc. and accordingly find wide applications as automobile parts, electrical parts, displays, etc. However, they have a drawback of low impact strength.

In order to improve the impact strength, there is known a method of polymerizing a vinyl monomer mixture consisting of methyl methacrylate, styrene, acrylonitrile, etc. in the presence of a diene type rubber such as polybutadiene or the like in such a monomer proportion that the difference in refractive index between the diene type rubber and the polymer obtained by polymerizing the monomer mixture alone becomes substantially zero. As the polymers obtained according to the above method, there are, for example, a methyl methacrylate-butadiene-styrene copolymer resin and a methyl methacrylate-butadiene-styrene-acrylonitrile copolymer resin, and these resins are used in various applications. These resins, however, have double bonds in the molecular chain and accordingly are deteriorated by an ultraviolet light or oxygen in air, resulting in a reduction in transparency and impact resistance, and in discoloration. Thus, they have a fatal drawback of inferior weather resistance.

In order to improve the weather resistance, there has been proposed graft-polymerizing various vinyl monomers onto a rubbery polymer whose main molecular chain is substantially saturated in place of the diene type rubber. Since this rubbery polymer has no double bond unlike the diene type rubber and consequently is low in radical activity, it happens in many cases that the vinyl monomers are not graft-polymerized onto the rubbery polymer and there is formed a mere blend of the rubbery polymer and a vinyl polymer resin. As a result, the resin obtained, when subjected to injection molding, has surface unevenness, very low gloss and transparency, and is inferior in impact strength, tensile strength (large anisotropy of strength), etc.

Further, the resin is insufficient in fatigue characteristics when molded, fitted and subjected to, for example, repeated stressing, and therefore has limited applications when used as a part.

The present inventors have made intensive study on the above matters and, as a result, found that a weather-resistant resin greatly superior in tintability, impact resistance at low temperatures, anisotropy in strength, fatigue characteristics and moldability can be obtained by graft-copolymerizing an aromatic alkenyl compound or an aromatic alkenyl compound and a monomeric compound copolymerizable therewith onto a rubber component which is a hydrogenation product of a copolymer of at least one conjugated diene and one alkenyl compound and further that a weather-resistant resin superior in transparency and impact resistance (in particular, falling ball impact strength at low temperatures), improved in anisotropy in strength and very superior in fatigue characteristics and moldability can be obtained by graft-polymerizing an alkenyl monomer composed mainly of a (meth)acrylic acid ester and satisfying the specific requirements, in the presence of the above rubber component.

According to this invention, there is provided a process for producing a rubber-modified thermoplastic resin, which comprises polymerizing 30–100% by weight of (B) an aromatic alkenyl compound monomer and/or an alkyl (meth)acrylate monomer and 70-0% by weight of (C) at least one other monomeric compound copolymerizable therewith, in the presence of (A) a hydrogenated diene copolymer obtained by hydrogenating a diene copolymer (a) containing a random copolymer of 50% by weight or more of at least one conjugated diene and 50% by weight or less of an alkenyl aromatic compound, so that at least 70% by weight of the olefinic unsaturation in the diene copolymer is hydrogenated.

This invention further provides a process for producing the above rubber-modified thermoplastic resin comprising copolymerizing a (meth)acrylic acid ester monomer (B) which forms a homopolymer having a glass transition temperature of 50° C. or more and the monomeric compound (C) in the presence of the hydrogenated diene copolymer (A) so that the difference in refractive index between the hydrogenated diene copolymer (A) and the copolymer of the monomer (B) and the monomeric compound (C) becomes 0.01 or less.

This invention furthermore provides a process for producing a rubber-modified thermoplastic resin, which comprises graft-copolymerizing 30-100% by weight of an aromatic alkenyl compound monomer and/or a (meth)acrylic acid ester monomer and 70-0% by weight of an alkenyl cyanide compound in the presence of a hydrogenation product of a copolymer obtained by bonding an alkenyl aromatic compound polymer block to the aforementioned diene copolymer (a) containing a random copolymer, i.e. a hydrogenated block copolymer (A') consisting of an A-B block copolymer (a'-1) or an A-B-C block copolymer (a'-2) (A is an alkenyl aromatic compound polymer block, B is an alkenyl aromatic compound-conjugated diene random copolymer block, and C is a polymer block composed mainly of an alkenyl aromatic compound), wherein (i) the weight ratio of the alkenyl aromatic compound/the conjugated diene is 5-50/95-50, (ii) the total amount of the alkenyl aromatic compounds of the block A and the block C in the copolymer is 3-40% by weight, and (iii) the vinyl configuration content in the conjugated diene portion of the block B is 10-90%, and wherein at least 90% of the double bonds of the conjugated diene are saturated.

In this invention, the diene copolymer (a) to be hydrogenated, consisting of a conjugated diene and an alkenyl aromatic compound is as follows:

The conjugated diene monomer includes, for example, butadiene, isoprene, pentadiene and 2,3-dimethylbutadiene. The alkenyl aromatic compound includes, for example, styrene, p-methylstyrene and α-methylstyrene.

In this invention, in the diene copolymer (a), the weight ratio of the alkenyl aromatic compound/the conjugated diene is 5-50/95-50, preferably 10-40/-90-60, more preferably 15-35/85-65. When the content of the alkenyl aromatic compound is less than 5% by weight, the resulting rubber-modified thermoplastic resin has low tintability. When the content is more than 50% by weight, the resin has low impact resistance.

When there is used, as the conjugated diene copolymer (a), the A-B or A-B-C block copolymer (a') aforementioned, the total amount of the alkenyl aromatic compounds of the block A and the block C in the copolymer is 3-40% by weight, preferably 5-30% by weight. When the total amount is less than 3% by weight, the resulting rubber-modified thermoplastic resin has low tintability. When the total amount is more than 40% by weight, the resin has low impact resistance.

The vinyl configuration content in the conjugated diene portion of the random copolymer block B is 10-90%, preferably 15-85%, more preferably 20-80%, particularly preferably 30-60%. When the vinyl configuration content is less than 10%, the block copolymer (a') forms a polyethylene chain upon hydrogenation, resulting in loss of rubbery properties. When the vinyl configuration content is more than 90%, the block copolymer (a') has a high glass transition temperature upon hydrogenation, resulting in loss of rubbery properties and inferior impact resistance.

The polymer block C composed mainly of an alkenyl aromatic compound may be the same as the alkenyl aromatic compound polymer block A, or may be a copolymer of an alkenyl aromatic compound and other alkenyl compound. However, the polymer block C is preferably a taper block wherein the proportion of the alkenyl aromatic compound bound to the conjugated diene increases gradually in the polymer chain.

In the hydrogenated diene copolymer (A), the double bonds of the conjugated diene are hydrogenated in an amount of at least 70%, preferably at least 90%, more preferably at least 95%. When the double bonds are hydrogenated in an amount of less than 70%, the resulting rubber-modified thermoplastic resin has low weather resistance. In the hydrogenated block copolymer (A'), it is necessary that the double bonds of the conjugated diene be hydrogenated in an amount of at least 90%.

The number-average molecular weight of the diene copolymer (a) is preferably 10,000-1,000,000, more preferably 20,000-500,000, particularly preferably 50,000-300,000. When the molecular weight is less than 10,000, the resulting rubber-modified thermoplastic resin has low impact resistance. When the molecular weight is more than 1,000,000, the resin has poor appearance when molded.

It is preferable that the hydrogenated block copolymer of the present invention has an MFR of 0.1 g/10 min or more as measured at 230° C. under a load of 12.5 kg.

The hydrogenated diene copolymer (A) may be modified with an α,β-unsaturated carboxylic acid anhydride such as maleic anhydride, itaconic anhydride, fumaric anhydride or the like, or may be modified with an epoxy group-containing unsaturated compound such as glycidyl (meth)acrylate, allyl glycidyl ether, vinyl glycidyl ether or the like. This modification allows the resulting rubber-modified thermoplastic resin to have better compatibility with other resins such as engineering plastics or the like, whereby a mixed resin of improved properties can be obtained.

The molecular weight distribution Mw/Mn of the diene copolymer (a) is preferably 10 or less. When the molecular weight distribution is more than 10, the resulting rubber-modified thermoplastic resin has poor appearance when molded.

The diene copolymer (a) can be obtained by, for example, effecting anionic living polymerization using an organolithium initiator in a hydrocarbon solvent. A branched polymer can be obtained by adding the necessary amount of an at least tri-functional coupling agent at the completion of the above polymerization to effect a coupling reaction.

In order to control the content of the vinyl configuration (e.g. 1,2-configuration, 3,4-configuration), there is used an ether, a tertiary amine compound, or an alkoxide, phenoxide or sulfonate of an alkali metal such as sodium, potassium or the like.

As the organolithium initiator, there is used n-butyryllithium, sec-butyryllithium, tert-butyryllithium or the like.

As the hydrocarbon solvent, there is used hexane, heptane, methylcyclopentane, cyclohexane, benzene, toluene, xylene, 2-methylbutene-1, 2-methylbutene-2 or the like.

The polymerization can be effected batchwise or continuously. The polymerization temperature is preferably 0°–120° C., more preferably 20°–100° C. The polymerization time is preferably 10 minutes to 3 hours. The coupling agent has at least tri-functionality and includes, for example, tetra-chlorosilicon, butyltrichlorosilicon, tetrachlorotin, butyltrichlorotin, tetrachlorogermanium, bis(trichlorosilyl)ethane, divinylbenzene, a diester of adipic acid, an epoxidized liquid polybutadiene, epoxidized soybean oil, epoxidized linseed oil, tolylene diisocyanate, diphenylmethane diisocyanate, 1,2,4-benzenetriisocyanate and the like.

The thus obtained diene copolymer (a) is hydrogenated to obtain the hydrogenated diene copolymer (A) of this invention.

The hydrogenation reaction is effected by dissolving the diene copolymer (a) in a hydrocarbon solvent and hydrogenating the copolymer with hydrogen at a hydrogen pressure of 1–100 kg/cm$^2$ at 20°–150° C. in the presence of a hydrogenation catalyst.

The hydrogenation catalyst is a catalyst wherein a noble metal such as palladium, ruthenium, rhodium, platinum or the like is supported on silica, carbon, diatomaceous earth or the like; a catalyst consisting of a complex of rhodium, ruthenium, platinum or the like; a catalyst consisting of an organic carboxylate of cobalt, nickel or the like and an organoaluminum or an organolithium; and a catalyst consisting of a titanium compound such as dicyclopentadienyltitanium. dichloride, dicyclopentadienyldiphenyltitanium, dicyclopentadienyltitanium ditolyl, dicyclopentadienyltitanium dibenzyl or the like and an organometal compound of lithium, aluminum or magnesium.

In the process for producing a rubber-modified thermoplastic resin according to this invention, the alkenyl monomers are radical-polymerized in the presence of a hydrogenated diene copolymer (A) of this invention, according to, for example, an emulsion polymerization method, a solution polymerization method, a bulk polymerization method or a suspension polymerization method.

The alkenyl monomers used in this invention consist of 30–100% by weight of (B) an aromatic alkenyl compound monomer and/or a (meth) acrylic acid ester monomer and 0–70% by weight of (C) other monomeric compound copolymerizable with (B).

The aromatic alkenyl compound monomer includes styrene, α-methylstyrene, p-methylstyrene, vinylxylene, monochlorostyrene, dichlorostyrene, monobromostyrene, dibromostyrene, fluorostyrene, p-tert-butylstyrene, ethylstyrene, vinylnaphthalene, etc. These compounds can be used alone or in admixture of two or more. The aromatic alkenyl compound monomer is preferably styrene or an aromatic alkenyl compound monomer mixture containing styrene in an amount of at least 50% by weight.

The (meth)acrylic acid ester includes, for example, alkyl acrylates such as methyl acrylate, ethyl acrylate, propyl acrylate, butyl acrylate, amyl acrylate, hexyl acrylate, octyl acrylate, 2-ethylhexyl acrylate, cyclohexyl acrylate, dodecyl acrylate, octadecyl acrylate and the like; aryl acrylates such as phenyl acrylate, benzyl acrylate and the like; alkyl methacrylates such as methyl methacrylate, ethyl methacrylate, propyl methacrylate, butyl methacrylate, amyl methacrylate, hexyl methacrylate, octyl methacrylate, 2-ethylhexyl methacrylate, cyclohexyl methacrylate, t-butylcyclohexyl methacrylate, dodecyl methacrylate, octadeyl methacrylate and the like; aryl methacrylates such as phenyl methacrylate, benzyl methacrylate and the like; hydroxyalkyl (meth)acrylates such as hydroxyethyl (meth)acrylate, hydroxypropyl (meth)acrylate; and (meth)acrylic acid esters of hydroxyl-containing norbornene derivatives.

The alkyl (meth)acrylate monomer is such that a homopolymer thereof has a glass transition temperature of 50° C. or more (as measured by a differential scanning calorimeter), and the alkyl portion has 1–10 carbon atoms, preferably 1–6 carbon atoms, particularly preferably 1–4 carbon atoms. A methacrylic acid ester is preferred to an acrylic acid ester. Examples of the methacrylic acid ester include-methyl methacrylate, ethyl methacrylate, cyclohexyl methacrylate, hydroxyethyl methacrylate, hydroxypropyl methacrylate, t-butylcyclohexyl methacrylate, butyl methacrylate, hexyl methacrylate and methacrylic acid esters of hydroxyl group-containing norbornene derivatives.

The other monomeric compound (C) copolymerizable with (B) is preferably an alkenyl cyanide compound and includes acrylonitrile, methacrylonitrile, etc. Acrylonitrile is preferred.

Other monomers (C) which may optionally be used are, for example, unsaturated acid anhydrides such as maleic anhydride, itaconic anhydride, citraconic anhydride and the like; unsaturated acids such as acrylic acid, methacrylic acid and the like; and N-substituted maleimide compound such as N-methylmaleimide, N-butylmaleimide, N-(p-methylphenyl) maleimide, N-phenylmaleimide, N-cyclohexylmaleimide and the like. These compounds are used alone or in admixture of two or more in such an amount as to give no adverse effect on the rubber-modified thermoplastic resin aimed at in this invention.

When there is used, as the alkenyl monomers, a monomer mixture consisting mainly of an aromatic alkenyl compound monomer (B) and an alkenyl cyanide compound (C), the resulting rubber-modified thermoplastic resin has higher chemical resistance than the resin obtained without using the alkenyl cyanide compound and, in coating its molded article, substantially no undesirable phenomena such as nonuniform coating, cracking, insufficient adhesion and the like are caused. Thus, the effect of the thus-obtained rubber modified thermoplastic resin of this invention is much better.

[I] The case where an aromatic alkenol compound and a monomer copolymerizable therewith are graft-copolymerized.

When an aromatic alkenyl compound and an alkenyl cyanide compound are used, there can be obtained a rubber-modified thermoplastic resin higher in impact resistance, chemical resistance and coatability. When an aromatic alkenyl compound and an alkyl (meth)acrylate are used, there can be obtained a resin higher in weather resistance. The alkenyl cyanide compound is most preferably acrylonitrile, and the alkyl (meth)acrylate is most preferably methyl methacrylate.

The weight ratio of the aromatic alkenyl compound and/or (meth)acrylic acid ester monomer and the alkenyl cyanide compound monomer used is 30-100/70-0, preferably 35-98/65-2, more preferably 40-95/60-5.

Particularly when, as the monomer components, an aromatic alkenyl compound monomer and an alkenyl cyanide compound monomer are used, the weight ratio of the aromatic alkenyl compound/the alkenyl cyanide compound used is preferably 30-98/70-2, more preferably 60-95/40-5.

The content of the hydrogenated diene copolymer (A) in the rubber-modified thermoplastic resin of this invention can be selected appropriately depending upon the intended application of the resin; however, it is 5-45% by weight, preferably 10-40% by weight, for preventing the impact resistance of the resin from being impaired.

Examples of preferable monomer combinations used in this invention are shown below.

(1) Styrene-acrylonitrile
(2) Styrene-methyl methacrylate
(3) Styrene-acrylonitrile-methyl methacrylate By replacing a part or the whole of the above styrene with α-methylstyrene, heat resistance can be imparted. By replacing a part or the whole of the above styrene with a halogenated styrene, flame retardancy can be imparted. In the above monomer combinations in which methyl methacrylate is employed, the resulting rubber-modified thermoplastic resin has improved transparency and excellent tintability.

The methyl ethyl ketone-soluble portion of the rubber-modified thermoplastic resin obtained according to the process of this invention has an intrinsic viscosity $[\eta]$ as measured at 30° C., of preferably 0.2 dl/g or more, more preferably 0.25-1.5 dl/g, particularly preferably 0.3-1.2 dl/g.

The grafting degree of the rubber-modified thermoplastic resin of this invention ( i. e. the weight proportion of the graft monomers bonded to the rubber component, to the rubber component) is preferably 20-90% by weight, more preferably 25-85% by weight, particularly preferably 30-80% by weight. When the grafting degree is less than 20% by weight, the resulting resin has very low solvent resistance (e.g. kerosene resistance, gasoline resistance) and poor appearance when molded (e.g. tintability, weld appearance), though the resin has sufficient impact strength.

[II] The case where a (meth)acrylic acid ester and a monomer copolymerizable therewith are graft copolymerized.

In this case, as the alkenyl monomers to be graft copolymerized, there is used a combination of an alkyl (meth)acrylate (B) and other monomeric compound (C) copolymerizable therewith, whereby a transparent graft polymer can be produced.

In order to obtain a transparent resin by graft-polymerizing a combination of a (meth)acrylic acid ester and a monomer copolymerizable therewith onto a hydrogenated diene copolymer (A), it is preferable to select the composition of the above two monomers appropriately so that the difference in refractive index between the hydrogenated diene copolymer (A) and the copolymer of the above monomer mixture alone becomes 0.01 or less, preferably 0.005 or less. When the refractive index difference is more than 0.01, the resulting rubber-modified thermoplastic resin has low transparency. Incidentally, the refractive index of the copolymer of the monomer mixture per se [this copolymer is different from the graft-copolymer of the monomer mixture onto the hydrogenated diene copolymer (A)] can be known by calculating from a theoretical formula or by actually measuring the refractive index of the copolymer obtained by polymerizing the monomer mixture alone.

The weight ratio of the (meth)acrylic acid ester and the copolymerizable monomeric compound used is not critical and can be appropriately varied depending upon the refractive index of the hydrogenated diene copolymer (A), though it is preferably 30-98/70-2, more preferably 50-95/50-5, particularly preferably 60-90/-40-10.

Specific examples of the copolymerizable monomeric compound are as aforementioned and are preferably an aromatic alkenyl compound and/or an alkenyl cyanide compound.

In the process for producing a transparent rubber-modified thermoplastic resin, the content of the rubbery polymer (this content is hereinafter referred to as the rubber content) can be appropriately varied depending upon the application of the resin; though it is 5-35% by weight, preferably 10-30% by weight in order to satisfy the impact resistance, moldability and transparency required for the resin. When the rubber content is less than 5% by weight, the resulting resin always has insufficient impact resistance. When the rubber content is more than 35% by weight, the resin has low surface hardness. The monomer mixture which is to form a matrix resin occupies the balance.

In the above [I] and [II], use of an N-substituted maleimide compound as a copolymerizable monomer to be grafted is preferable because it enables production of a graft polymer having excellent heat resistance.

The N-substituted maleimide compound includes N-cyclohexylmaleimide, N-methylmaleimide, N-ethylmaleimide, N-n-propylmaleimide, N-isopropylmaleimide, N-n-butylmaleimide, N-sec-butylmaleimide, N-tert-butylmaleimide, N-octylmaleimide, etc. These maleimide monomers themselves are colorless, and the resins of this invention obtained using them can give molded articles less colored and accordingly have no restriction for application.

In order to obtain a transparent resin by graft-polymerizing (i) a (meth)acrylic acid ester compound, (ii) an N-substituted maleimide compound and (iii) a monomer copolymerizable with (i) and (ii) onto a hydrogenated diene copolymer (A), it is preferable to select the composition of the above three monomers (i), (ii) and (iii) appropriately so that the difference in refractive index between the hydrogenated diene copolymer (A) and the copolymer of only the above monomers (i), (ii) and (iii) becomes 0.01 or less, preferably 0.005 or less. The weight ratio of the (meth)acrylic acid ester compound (i), the N-substituted maleimide compound (ii) and other alkenyl monomer (iii) used is not critical, though it is preferably 45-96/2-50/53-2, more preferably 55-95/3-40/42-3, particularly preferably 65-90/5-30/-30-4. When the weight ratio of the three monomers (i), (ii) and (iii) is within the above range, there can be obtained a rubber-modified thermoplastic resin superior in properties such as weather resistance, heat resistance, moldability and the like.

The polymerization for producing a transparent rubber-modified thermoplastic resin can be effected by a known polymerization method such as solution polymerization, suspension polymerization, bulk polymerization, emulsion polymerization or the like. In particular, solution polymerization and suspension polymerization are preferable.

The thus obtained transparent rubber-modified thermoplastic resin is superior in transparency, weather resistance, impact resistance, fatigue characteristics and moldability, and can be widely used in such applications as the above excellent properties are utilized.

The rubber-modified thermoplastic resin of this invention can be blended with other polymers such as thermoplastic resins, thermoplastic elastomers and the like depending upon the application.

As said other polymers, which can be blended with the resin of this invention, there can be mentioned, for example, a polyethylene, a polypropylene, an ethylene-propylene copolymer, a polyvinyl chloride, a polyphenylene ether, a polycarbonate, a polyethylene terephthalate, a polybutylene terephthalate, a polyacetal, a polyamide, a polyvinylidene fluoride, a polystyrene, a high-impact polystyrene, a styrene-acrylonitrile copolymer, an ABS resin, a styrene-methyl methacrylate copolymer, a styrene-maleic anhydride copolymer, a chlorinated polyethylene, an AES resin other than the resin of this invention, an EPR, an EPDM, a 1,2-polybutadiene, a polyamide elastomer, a polyester elastomer, a styrene-butadiene block copolymer, a styrene-isoprene block copolymer, hydrogenation products of these block copolymers, etc. These polymers can be used alone or in combination of two or more.

The transparent rubber-modified thermoplastic resin with a controlled refractive index can be blended, depending upon the application, with other polymers such as methacrylic acid ester polymer, styrene-methyl methacrylate copolymer, styrene-methyl methacrylateacrylonitrile copolymer, styrene-α-methylstyrene-methyl methacrylate-acrylonitrile copolymer, styrene-methyl methacrylate-maleimide copolymer and the like to obtain a transparent resin composition.

Said other polymers to be blended with the rubber-modified thermoplastic resin of this invention, preferably have, in view of the transparency of the resulting composition, such a refractive index that the difference between said refractive index and the refractive index of the resin of this invention is 0.01 or less, preferably 0.005 or less.

The rubber-modified thermoplastic resin of this invention, when blended with a polyolefin, gives a thermoplastic resin composition superior in impact resistance, weather resistance and chemical resistance.

As the polyolefin, there can be mentioned homopolymers such as polyethylene, polypropylene and the like, as well as copolymers of α-olefins such as ethylene, propylene and the like. Of these homo- and co-polymers, polypropylene is preferable and crystalline polypropylene is more preferable. The polypropylene preferably has a density of 0.89–0.93 g/cm$^3$ and a melt flow rate of 0.1–70 g/10 min as measured by ASTM D 1238L.

As the polypropylene, there can be used not only a propylene homopolymer and a block or random copolymer of propylene and 20% or less of another α-olefin (e.g. ethylene, 1-butene, 4-methyl-1-pentene), but also a mixture of a propylene polymer and a small amount of an ethylene-propylene copolymer rubber and/or a polyethylene.

The proportion of the polyolefin in the thermoplastic resin composition mentioned above is preferably 99–1% by weight, more preferably 98–2% by weight, particularly preferably 95–5% by weight. When the proportion is more than 99% by weight, the resulting resin composition has low impact resistance.

The rubber-modified thermoplastic resin of this invention, when blended with a polyamide elastomer, can give a thermoplastic resin composition superior in permanent antistatic property, mechanical strengths typified by impact strength, heat resistance, moldability, weather resistance and surface appearance.

As the polyamide elastomer, there can be mentioned block copolymers having a hard segment and a soft segment, in which the hard segment (X) is an aminocarboxylic acid or lactam having 6 or more carbon atoms or a nylon mn salt wherein m+n is 12 or more carbon atoms and the soft segment (Y) is a polyol, specifically a poly(alkylene oxide) glycol, and the proportion of the X component in the elastomer is 10–95% by weight, preferably 20–90% by weight, more preferably 30–90% by weight.

Into the above composition of the rubber-modified thermoplastic resin (I) and the polyamide elastomer (II), there can be further incorporated, if necessary, (III) a modified vinyl polymer having at least one functional group selected from the group consisting of a carboxyl group, an acid anhydride group, an amino group, an epoxy group and a hydroxyl group and/or a rubbery modified vinyl polymer. The component (III) functions as an agent for making the components (I) and (II) compatible with each other.

In the above thermoplastic resin composition consisting mainly of the polyamide elastomer (II), the rubber-modified thermoplastic resin (I) and the modified vinyl polymer and/or the rubbery modified vinyl polymer (III) used if necessary, the proportion of the components (I) to (II) is preferably such that the component (II) is 1–90% by weight, preferably 3–75% by weight, more preferably 5–60% by weight and the component (I) is 99–10% by weight, preferably 97–25% by weight, more preferably 95–40% by weight, the total of the components (I) and (II) being 100% by weight.

When the proportion of the component (II) is 1% by weight or more, the resulting composition is endowed with an antistatic property, but when the proportion is more than 90% by weight, the composition is flexible and has poor mechanical properties.

The proportion of the component (III) is 0–100 parts by weight, preferably 1–50 parts by weight per 100 parts by weight of the component (I) plus the component (II).

The composition consisting only of the components (I) and (II) has mechanical strengths typified by impact resistance but the incorporation of the component (III) thereinto allows the resulting composition to have higher mechanical strengths and an antistatic property. When the proportion of the component (III) is more than 100 parts by weight per 100 parts by weight of the component (I) plus the component (II), the resulting composition has poor surface appearance.

The rubber-modified thermoplastic resin (I) of this invention, when blended with (II') a polyester elastomer (II'-1) and/or a thermoplastic polyurethane (II'-2) can give a resin composition superior in weather resistance, low-temperature processability, impact resistance and tintability.

The polyester elastomer (II'-1) is a polyester block copolymer consisting of a high-melting polyester segment and a low-melting polymer (e.g. polyethylene glycol) segment having a molecular weight of 400–6,000, wherein a high polymer composed only of the high-melting polymer segment has a melting point of 150° C. or more and a high polymer composed only of the low-melting polyester segment has a melting or softening point of 80° C. or less.

The thermoplastic polyurethane (II'-2) can be obtained by reacting, with uniform mixing and heating, a high molecular weight compound (d) having a molecular weight of 500–2,000 and containing at least two hydroxyl groups, a compound (e) having a molecular weight of 500 or less and containing at least two groups capable of reacting with isocyanato group, and an organic diisocyanate (f) at an equivalent ratio of (d):(e) of 1:0.2–4 and an equivalent ratio of [(d)+(e)]:(f) of 1:0.75–1.3.

Into a thermoplastic resin composition of the components (I) and (II'), there may be further incorporated, if necessary, (III) a modified vinyl polymer having at least one functional group selected from the group consisting of a carboxyl group, an acid anhydride group, an amino group, an epoxy group and a hydroxyl group and/or a rubbery modified vinyl polymer.

Into the above thermoplastic resin composition consisting mainly of the thermoplastic elastomer (II'), the rubber-modified thermoplastic resin (I) and the modified vinyl polymer and/or the rubbery modified vinyl polymer (III) used, if necessary, the proportion of the components (I) to (II') is such that the component (II') is 10–90% by weight, preferably 30–70% by weight and the component (I) is 90–10% by weight, preferably 70–30% by weight, the total of the component (I) and the component (II') being 100% by weight.

When the proportion of the component (II') is 10% by weight or more, the resulting composition has flexibility, excellent elongation and excellent low-temperature processability, but when the proportion is more than 90% by weight, the composition is inferior in weather resistance, impact strength at low temperatures and tintability.

The proportion of the component (III) is 0–100 parts by weight, preferably 1–50 parts by weight, per 100 parts by weight of the component (I) plus the component (II').

The composition consisting only of the components (I) and (II') has mechanical strengths typified by impact resistance but the incorporation of the component (III) thereinto allows the resulting composition to have higher mechanical strengths and an antistatic property.

The rubber-modified thermoplastic resin of this invention and the composition thereof can comprise additives ordinarily used in resins, such as antioxidant (e.g. hindered phenol type, phosphorus type, sulfur type), photostabilizer, ultraviolet absorber, lubricant, coloring agent, flame retardant, reinforcing agent and the like.

The rubber-modified thermoplastic resin of this invention is superior in appearance when molded, impact resistance, mechanical properties and weather resistance, and is greatly improved in durability when subjected to, for example, repeated stressing after molding and fitting, as well as in moldability.

Such superiority in a variety of properties cannot be obtained with conventional rubber-modified thermoplastic resins, for example, ABS resins, AES resins and AAS resins. Therefore, the rubber-modified thermoplastic resin of this invention can find new applications.

Further, the rubber-modified thermoplastic resin of this invention can be formed into not only transparent molded articles but also colored molded articles of desired color with clarity and depth.

Thus, the rubber-modified thermoplastic resin of this invention has a very high industrial value.

This invention is described in more detail below referring to Examples. In the Examples, parts and % are by weight unless otherwise specified.

Physical properties were measured in accordance with the following test methods:

(1) Refractive index

Measured at 25° C. using an Abbé's refractometer.

(2) Izod impact strength

Measured in accordance with ASTM D 256 (cross-sectional area = $\frac{1}{4} \times \frac{1}{2}$ in., notched).

(3) Total light transmittance and haze

Measured in accordance with ASTM D 1003 (thickness = 3.2 cm).

(4) Weather resistance

A test sample was placed for 1,000 hours in a sunshine weatherometer (WEL-6XS-DC manufactured by Suga Shikenki K.K.) using a carbon arc as a light source and then measured for Izod impact strength, followed by calculation of retention of Izod impact strength.

Test conditions

Black panel temperature: 63°±3° C.
Humidity in chamber: 60±5% R.H.
Rainfall cycle: 18 minutes every 2 hours
Carbon exchange cycle: 60 hours
Izod impact strength: ASTM D 256 (cross-sectional area = $\frac{1}{8} \times \frac{1}{2}$ in.)

(5) Falling weight impact strength

Measured on a test sample (a molded article having a thickness of 1.6 mm) using a DuPont impact tester (R at the striker front = $\frac{1}{2}$ in.).

(6) Anisotropy in tensile strength

Using a 30-mmφ extruder, extrusion molding was effected at a drawing speed of 1 m/min to obtain a sheet of 150 mm (width)×2 mm (thickness). By cutting the sheet were prepared a test sample parallel (∥) to the extrusion direction and a test sample transverse (⊥) to the extrusion direction. The test samples were measured for tensile strength in accordance with ASTM D 638.

(7) Melt flow rate

Measured in accordance with ASTM D 1238 (9/10 in.).

(8) Appearance of molded article (tintability)

A compound containing a rubber-modified thermoplastic resin and having the following compounding recipe was passed through an extruder to obtain colored pellets. The pellets were molded into a plate for color tone evaluation. The plate was measured for tintability. That is, a plate from a black compound was measured for lightness by a color difference meter and the lightness value was expressed in accordance with the Munsell color system (a larger value means lower tintability); plates from other compounds (blue and red compounds) were measured for saturation visually.

| Balck compound | |
|---|---|
| Resin | 100 parts |
| Carbon black | 0.5 part |
| Calcium stearate | 0.3 part |
| Blue compound | |
| Resin | 100 parts |
| Ultramarine | 1.0 part |
| Calcium stearate | 0.5 part |
| Red compound | |
| Resin | 100 parts |

| Red iron oxide | 1.0 part |
| Calcium stearate | 0.5 part |

(9) Fatigue characteristics

Using a 30-mm$\phi$ extruder, extrusion molding was effected at a drawing speed of 1 m/min to obtain a sheet of 150 mm (width)×1 mm (thickness). By cutting the sheet were prepared a test sample parallel (||) to the extrusion direction and a test sample transverse (⊥) to the extrusion direction. These test samples were repeatedly subjected to elongation and shrinkage under a load of 20 kg at 1,000 rpm to determine the fatigue characteristics in terms of "number of repetitions up to breakage".

(10) Grafting degree

A given amount (x) of a graft polymer was placed in acetone and shaken for 2 hours using a shaking machine to dissolve the free copolymer portion. The resulting solution was subjected to centrifugation for 30 minutes at 23,000 rpm. The insolubles were separated and vacuum-dried at 120° C. for 1 hour to obtain insolubles (y). The grafting degree of the graft polymer was calculated from the following equation:

$$\text{Grafting degree (\%)} = \frac{[(y) - (x) \times (\text{rubber fraction in graft polymer})]}{[(x) \times (\text{rubber fraction in graft polymer})]} \times 100$$

Production of rubbery polymer (base rubber) Nos. 1–10

The proportions (parts by weight) of components per 100 parts by weight of polymer is shown in PHR unit below.

[Base Rubber No. 1]

(1) Into a 5-liter autoclave were fed 2,500 g of cyclohexane, 175 g of styrene and 325 g of 1,3-butadiene all degassed and dehydrated. Thereto were added 2.5 g of tetrahydrofuran and 0.34 g of n-butyllithium, and temperature-elevating polymerization was effected by gradually increasing the polymerization temperature from 30° C. to 80° C. When the conversion reached 100%, 0.14 g of SiCl$_4$ was added. Then, 2,6-di-tert-butylcatechol was added and the solvent was removed by steam stripping. The residue was dried by passing through heated rolls at 120° C., to obtain a polymer. The thus obtained styrene-butadiene copolymer had a vinyl configuration content of 30%, a styrene content (Bd-St) of 35% by weight, an at least three-branched polymer content of 56% by weight and a number-average molecular weight Mw/Mn (as measured by GPC analysis) of 1.5.

(2) The conjugated diene polymer obtained in (1) above was fed into a 3-liter autoclave and formed into a 15% cyclohexane solution. The autoclave inside was purged with nitrogen. Thereinto was fed a catalyst solution consisting of nickel naphthenate:n-butyllithium:tetrahydrofuran=1:8:20 (molar ratio) prepared in a separate container in such an amount that the proportion of nickel might be 1 mole per 2,000 moles of the olefin portion. Thereafter, hydrogen was introduced into the reaction system and hydrogenation reaction was effected at 70° C. After the hydrogenation degree had been controlled based on the amount of hydrogen consumed, the residual hydrogen was replaced by nitrogen, and 1 PHR of 2,6-di-tert-butyl-p-cresol was added. Catalyst removal and coagulation were repeated, after which roll drying was effected according to a conventional method to obtain a hydrogenated diene copolymer having a hydrogenation degree of 90%.

[Base Rubber No. 2]

The same procedure as in the production of Base Rubber No. 1 was repeated, except that the amounts of styrene and 1,3-butadiene fed were changed to 150 g and 350 g, respectively, to obtain a base rubber having a styrene content (Bd-ST) of 30% and a hydrogenation degree of 95%.

[Base Rubber No. 3]

The same procedure as in the production of Base Rubber No. 2 was repeated, except that no coupling reaction was effected, to obtain a base rubber having a styrene content (Bd-ST) of 30% and a hydrogenation degree o f 95%.

[Base Rubber No. 4]

The same procedure as in the production of Base Rubber No. 3 was repeated, except that the amounts of styrene and 1,3-butadiene fed were changed to 275 g and 225 g, respectively, to obtain a base rubber having a styrene content (Bd-ST) of 55% and a hydrogenation degree of 95%.

[Base Rubber No. 5]

The same procedure as in the production of Base Rubber No. 3 was repeated, except that the amounts of styrene and 1,3-butadiene fed were changed to 150 g and 350 g, respectively, to obtain a base rubber having a styrene content (Bd-ST) of 30% and a hydrogenation degree of 60%.

[Base Rubber No. 6]

The same procedure as in the production of Base Rubber No. 1 was repeated, except that the amounts of styrene and 1,3-butadiene were changed to 150 g and 350 g, respectively, and no hydrogenation reaction was effected, whereby an unhydrogenated base rubber having a styrene content (Bd-ST) of 30% was obtained.

[Base Rubber No. 7]

The same procedure as in the production of the base rubber No. 3 was repeated, except that the amounts of styrene and 1,3-butadiene fed were changed to 50 g and 450 g, respectively, to obtain a base rubber having a styrene content (Bd-ST) of 10% and a hydrogenation degree of 95%.

[Base Rubber No. 8]

The same procedure as in the production of the base rubber No. 7 was repeated, except that the hydrogenation degree was changed to 60%, to obtain a base rubber having a styrene content (Bd-ST) of 10% and a hydrogenation degree of 60%.

[Base Rubber No. 9]

Into a 100-liter stainless steel autoclave provided with a paddle type agitator was fed 90 parts of ion-exchanged water containing 0.2 part of calcium stearate, 1.5 parts of potassium laurate, 0.1 part of a sodium alkylnaphthalenesulfonate, 0.1 part of potassium hydroxide and 1.5 parts of potassium chloride. Then, 70 parts of n-butyl acrylate and 30 parts of styrene were added. The temperature of the contents was elevated in a nitrogen atmosphere with stirring at 90 rpm and, when the temperature reached 45° C., potassium persulfate was added. Polymerization reaction was effected while maintaining the reaction temperature at 45° C. When the conversion reached 90%, 0.1 part of diethylhydroxylamine was added to terminate the reaction. The unreacted monomers were substantially removed by steam distillation to obtain a rubbery polymer latex.

The polymer latex was mixed with alcohol to cause precipitation. The precipitate was purified and dried to obtain a rubbery polymer.

[Base Rubber No. 10]

The same procedure as in the production of the base rubber No. 9 was repeated, except that the monomer composition was changed to 50 parts of n-butyl acrylate, 30 parts of 1,3-butadiene and 20 parts of styrene, to obtain a rubbery polymer.

EXAMPLE 1

Into a 10-liter stainless steel autoclave provided with a ribbon type agitating element were fed 30 parts of the hydrogenated Base Rubber No. 1 beforehand formed into a uniform solution, 70 parts of styrene, 120 parts of toluene and 0.1 part of tert-dodecylmercaptan. The temperature of the autoclave contents was elevated with stirring and, when the temperature reached 50° C., 0.5 part of benzoyl peroxide and 0.1 part of dicumyl peroxide were added. The temperature was further elevated to 80° C., and polymerization reaction was effected with stirring at 200 rpm while maintaining the temperature at 80° C. Six hours after the start of the reaction, the temperature was elevated to 120° C. in one hour, and the reaction was continued for a further 2 hours at that temperature and then terminated. The polymerization conversion was 97%.

The reaction mixture was cooled to 100° C. and 0.2 part of 2,2-methylene-bis- (4-methyl-6-tert-butylphenol) was added. The reaction mixture was taken out from the autoclave and subjected to steam distillation to remove the unreacted materials and the solvent. The reside was finely ground and passed through a 40-mm$\phi$ vented extruder (220° C., 700 mmHg) to substantially remove the volatile matter and simultaneously pelletize the formed poisoner.

The thus obtained resin composition with the compounding recipe shown in Table 1 was passed through an extruder to obtain colored pellets. The pellets were molded into a plate for color tone evaluation.

EXAMPLES 2–7 AND COMPARATIVE EXAMPLES 1–6

The same procedure as in Example 1 was repeated, except that the type of base rubber, the monomers, etc. were changed to those shown in Table 1, to obtain thermoplastic resins.

The compositions and properties of the thermoplastic resins obtained in Examples 1–7 and Comparative Examples 1–6 are shown in Table 1.

TABLE 1

|  | Example | | | | | | |
|---|---|---|---|---|---|---|---|
|  | 1 | 2 | 3 | 4 | 5 | 6 | 7 |
| Composition of thermoplastic resin Base Rubber |  |  |  |  |  |  |  |
| No. | 1 | 2 | 3 | 3 | 3 | 3 | 3 |
| Styrene content (Bd-ST) (%) | 35 | 30 | 30 | 30 | 30 | 30 | 30 |
| Hydrogenation degree (%) | 90 | 95 | 95 | 95 | 95 | 95 | 95 |
| Amount used (parts) | 30 | 30 | 30 | 30 | 30 | 30 | 30 |
| Amount of graft monomer used (parts) |  |  |  |  |  |  |  |
| Styrene | 70 | 49 | 49 | 49 | 60 | 42 | 35 |
| Acrylonitrile | — | 21 | 21 | 21 | 10 | — | 14 |
| Methyl methacrylate | — | — | — | — | — | 28 | 21 |
| Blend polymer Type and amount (parts) | — | — | — | AS 30*2 | — | — | — |
| General properties |  |  |  |  |  |  |  |
| MFR (g/10 min) | 25 | 10 | 10 | 15 | 18 | 6 | 12 |
| Izod impact strength (Kg · cm/cm) | 15 | 42 | 44 | 22 | 40 | 20 | 22 |
| Mechanical properties |  |  |  |  |  |  |  |
| Falling weight impact strength (Kg · cm) |  |  |  |  |  |  |  |
| 23° C. | 200 | 350 | 370 | 290 | 340 | 240 | 250 |
| −30° C. | 90 | 240 | 250 | 200 | 230 | 140 | 150 |
| Tensile strength (Kg/cm$^2$) |  |  |  |  |  |  |  |
| Extrusion direction | 365 | 430 | 445 | 485 | 400 | 430 | 440 |
| Transverse direction | 360 | 420 | 430 | 475 | 395 | 425 | 425 |
| Appearance of molded article Tintability |  |  |  |  |  |  |  |
| Black compound | 1.3 | 1.0 | 1.1 | 1.0 | 1.1 | 1.0 | 1.0 |
| Blue compound | ○ | ○ | ○ | ○ | ○ | ○ | ○ |
| Red compound | ○ | ○ | ○ | ○ | ○ | ○ | ○ |
| Surface gloss | 89 | 88 | 89 | 91 | 90 | 90 | 91 |
| Weather resistance Retention of impact strength (%) resistance | 83 | 85 | 87 | 89 | 85 | 90 | 88 |

|  | Comparative Example | | | | | |
|---|---|---|---|---|---|---|
|  | 1 | 2 | 3 | 4 | 5 | 6 |
| Composition of thermoplastic resin Base Rubber |  |  |  |  |  |  |
| No. | 4 | 5 | 6 | EP01*1 | EP01*1 | EP01*1 |
| Styrene content (Bd-ST) (%) | 55 | 30 | 30 | — | — | — |
| Hydrogenation degree (%) | 95 | 60 | 0 | — | — | — |
| Amount used (parts) | 30 | 30 | 30 | 21 | 21 | 21 |
| Amount of graft monomer used (parts) |  |  |  |  |  |  |

TABLE 1-continued

| | | | | | | |
|---|---|---|---|---|---|---|
| Styrene | 49 | 49 | 49 | 55 | 79 | 47 |
| Acrylonitrile | 21 | 21 | 21 | 24 | — | — |
| Methyl methacrylate | — | — | — | — | — | 32 |
| Blend polymer | — | — | — | — | — | — |
| Type and amount (parts) | | | | | | |
| General properties | | | | | | |
| MFR (g/10 min) | 11 | 10 | 10 | 11 | 24 | 7 |
| Izod impact strength (Kg · cm/cm) | 5 | 42 | 44 | 38 | 14 | 19 |
| Mechanical properties | | | | | | |
| Falling weight impact strength (Kg · cm) | | | | | | |
| 23° C. | 80 | 350 | 370 | 330 | 140 | 170 |
| −30° C. | 10 | 270 | 280 | 150 | 30 | 40 |
| Tensile strength (Kg/cm $^2$) | | | | | | |
| Extrusion direction | 455 | 440 | 435 | 435 | 370 | 395 |
| Transverse direction | 445 | 420 | 420 | 385 | 320 | 330 |
| Appearance of molded article | | | | | | |
| Tintability | | | | | | |
| Black compound | 1.1 | 1.1 | 1.0 | 1.8 | 1.9 | 1.6 |
| Blue compound | ○ | ○ | ○ | X | X | Δ |
| Red compound | ○ | ○ | ○ | X | X | Δ |
| Surface gloss | 88 | 84 | 80 | 80 | 85 | 78 |
| Weather resistance | 85 | 45 | 18 | 85 | 83 | 87 |
| Retention of impact strength (%) | | | | | | |
| resistance | | | | | | |

Note:
*[1] A trade name of Japan Synthetic Rubber Co., Ltd. for an ethylene-propylene rubber ($ML_{1+4}$ (100° C.) = 19)
*[2] Parts by weight Per 70 parts by weight of the thermoplastic resin.

As is clear from Table 1, the thermoplastic resins of Examples 1–7 are superior in all of impact resistance, mechanical properties, appearance of molded article and weather resistance.

The thermoplastic resins of the Comparative Examples all contain a base rubber which is outside the scope of this invention, and are inferior in at least one of the impact resistance, mechanical properties, appearance of molded article and weather resistance.

EXAMPLE 8

Into a 10-liter stainless steel autoclave provided with a paddle type agitator were fed 20 parts of Base Rubber No. 2 having a refractive index of 1.507 which had been beforehand formed into a uniform solution, 12 parts of styrene, 100 parts of toluene and 0.1 part of t-dodecylmercaptan. The temperature of the autoclave contents was elevated with stirring and, when the temperature reached 50° C., 69 parts of methyl methacrylate and 0.5 part of t-butyl peroxyisopropyl carbonate were added. After the autoclave inside had been purged with nitrogen, the temperature of the autoclave contents was elevated to 90° C. The polymerization was continued at this temperature with stirring until the conversion reached 74%. When the conversion reached 74%, the polymerization was terminated, and an antioxidant was added. The reaction mixture was taken out from the autoclave and subjected to steam distillation to remove the unreacted monomers and the solvent. The residue was finely ground, dried and passed through a 40-mmφ vented extruder for pelletization. The thus obtained graft copolymer had a rubber content of 25%. The refractive index of the copolymer composed only of the monomer mixture was 1.5068.

The graft copolymer pellets obtained above were passed through an injection molding machine to form a test piece. The test piece was measured for physical properties.

EXAMPLES 9–12 AND COMPARATIVE EXAMPLES 7–11

The same procedure as in Example 8 was repeated, except that the type of base rubber and the monomers were changed to those shown in Table 2, to obtain thermoplastic resins.

The compositions and properties of the thermoplastic resins obtained in Examples 8–12 and Comparative Examples 7–12 are shown in Table 2.

As is clear from Table 2, the thermoplastic resins of Examples 8–12 are particularly superior in transparency.

TABLE 2

| | Example | | | | |
|---|---|---|---|---|---|
| | 8 | 9 | 10 | 11 | 12 |
| Composition of thermoplastic resin | | | | | |
| Base Rubber | | | | | |
| No. | 2 | 3 | 3 | 3 | 7 |
| Styrene content (Bd-ST) (%) | 30 | 30 | 30 | 30 | 10 |
| Hydrogenation degree (%) | 95 | 95 | 95 | 95 | 95 |
| Amount used (parts) | 20 | 20 | 20 | 15 | 20 |
| Refractive index | 1.507 | 1.507 | 1.507 | 1.507 | 1.493 |
| Graft monomer | | | | | |
| Amount used (parts) | | | | | |
| Methyl methacrylate | 68 | 64 | 64 | 68 | 80 |
| Styrene | 12 | 11 | 11 | 12 | — |
| Acrylonitrile | — | 5 | 5 | 5 | — |
| Conversion | 75 | 75 | 75 | 75 | 75 |
| Refractive index of polymer | 1.5068 | 1.5065 | 1.5065 | 1.5065 | 1.490 |
| Difference in refractive index between rubber and polymer | 0.0002 | 0.0005 | 0.0005 | 0.0005 | 0.003 |

TABLE 2-continued

| | | | | | |
|---|---|---|---|---|---|
| General properties | | | | | |
| MFR (g/10 min) | 7 | 13 | 13 | 15 | 8 |
| Izod impact strength (Kg · cm/cm) | 17 | 20 | 20 | 15 | 13 |
| Mechanical properties | | | | | |
| Tensile strength (Kg/cm²) | | | | | |
| Extrusion direction | 410 | 425 | 430 | 445 | 420 |
| Transverse direction | 405 | 415 | 415 | 440 | 410 |
| Falling weight impact strength | | | | | |
| 23° C. | 240 | 250 | 270 | 200 | 140 |
| −30° C. | 120 | 250 | 165 | 100 | 80 |
| Transparency | | | | | |
| Total light transmittance | 90 | 88 | 89 | 89 | 90 |
| Haze | 5 | 6 | 6 | 5 | 5 |
| Appearance of molded article | | | | | |
| Tintability | | | | | |
| Black compound | 1.0 | 1.1 | 1.1 | 1.0 | 1.0 |
| Blue compound | ◯ | ◯ | ◯ | ◯ | ◯ |
| Surface gloss | 91 | 90 | 90 | 91 | 91 |
| Weather resistance | 87 | 90 | 90 | 92 | 93 |
| Retention of impact strength (%) | | | | | |

| | Comparative Example | | | | |
|---|---|---|---|---|---|
| | 7 | 8 | 9 | 10 | 11 |
| Composition of thermoplastic resin | | | | | |
| Base Rubber | | | | | |
| No. | 3 | 8 | EP01*¹ | 9 | 10 |
| Styrene content (Bd-ST) (%) | 30 | 10 | — | — | — |
| Hydrogenation degree (%) | 95 | 60 | — | — | — |
| Amount used (parts) | 20 | 20 | 20 | 20 | 20 |
| Refractive index | 1.507 | 1.507 | 1.486 | 1.507 | 1.512 |
| Graft monomer | | | | | |
| Amount used (parts) | | | | | |
| Methyl methacrylate | 50 | 68 | 72 | 70 | 68 |
| Styrene | 20 | 12 | — | 10 | 12 |
| Acrylonitrile | 10 | — | 8 | — | — |
| Conversion | 75 | 75 | 75 | 75 | 75 |
| Refractive index of polymer | 1.519 | 1.495 | 1.493 | 1.503 | 1.505 |
| Difference in refractive index between rubber and polymer | 0.012 | 0.012 | 0.007 | 0.004 | 0.007 |
| General properties | | | | | |
| MFR (g/10 min) | 13 | 7 | 14 | 6 | 7 |
| Izod impact strength (Kg · cm/cm) | 15 | 14 | 12 | 8 | 10 |
| Mechanical properties | | | | | |
| Tensile strength (Kg/cm²) | | | | | |
| Extrusion direction | 420 | 400 | 405 | 415 | 425 |
| Transverse direction | 405 | 380 | 360 | 400 | 405 |
| Falling weight impact strength | | | | | |
| 23° C. | 240 | 220 | 200 | 150 | 190 |
| −30° C. | 140 | 120 | 90 | 20 | 110 |
| Transparency | | | | | |
| Total light transmittance | 72 | 70 | 78 | 85 | 77 |
| Haze | 35 | 30 | 23 | 8 | 15 |
| Appearance of molded article | | | | | |
| Tintability | | | | | |
| Black compound | 1.3 | 1.4 | 1.4 | 1.2 | 1.3 |
| Blue compound | Δ | Δ | Δ | ◯ | Δ |
| Surface gloss | 89 | 88 | 85 | 88 | 90 |
| Weather resistance | 82 | 89 | 87 | 90 | 30 |
| Retention of impact strength (%) | | | | | |

Note: *1 Same as in Table 1.

Production of hydrogenated block copolymers a–e as a base rubber for rubber-modified thermoplastic resin

[Hydrogenated block copolymer a]

Into a 5-liter autoclave were fed 2,500 g of cyclohexane and 25 g of styrene both degassed and dehydrated. Then, 9.8 g of tetrahydrofuran and 0.2 g of n-butyllithium were fed. The resulting mixture was subjected to isothermal polymerization at 50° C. (first stage polymerization). When the conversion reached about 100%, a mixture consisting of 300 g of 1,3-butadiene and 75 g of styrene was continuously added at a rate of 75 g per 10 minutes to successively effect polymerization at 70° C. (second stage polymerization). When the conversion reached about 100%, a mixture consisting of 50 g of 1,3-butadiene and 50 g of styrene was added in one portion to effect adiabatic polymerization (third stage polymerization). In the course of polymerization, sampling was made every 5 minutes to measure the then formed polymer for styrene content and microstructure of 1,3-butadiene. When the conversion reached 100%, the reaction mixture was cooled to 70° C., and there were added 0.6 g of n-butyllithium, 0.6 g of 2,6-di-tert-butyl-p-cresol, 0.28 g of bis(cyclopentadienyl)titanium dichloride and 1.1 g of diethylaluminum chloride. The resulting mixture was subjected to reaction for 1 hour while maintaining the system pressure at 10 kg/cm² using hydrogen. The reaction mixture was cooled to room temperature and subjected to steam stripping to remove the solvent. The residue was dried by a roll at 120° C. to obtain a hydrogenated block copolymer a. The molecular characteristics of the hydrogenated block copolymer a are shown in Table 3.

[Hydrogenated block copolymers b–e]

The monomer composition, the polymerization aid and the polymerization conditions were appropriately changed so as to obtain the polymer structures shown in Table 3, whereby the hydrogenated block copolymers b–e shown in Table 3 were obtained. In Table 3, a–d are hydrogenated block copolymers falling in the scope of this invention, while e is a copolymer which is outside the scope of this invention and EP01 is a commercially available copolymer.

EXAMPLE 13

Into a 10-liter stainless steel autoclave provided with a ribbon type agitating element was fed a mixed solution of 30 parts of the hydrogenated block copolymer a (shown as a base rubber in Table 3) which had beforehand been formed into a uniform solution, 49 parts of styrene, 120 parts of toluene and 0.1 part of tert-dodecylmercaptan. The temperature of the autoclave contents was elevated with stirring and, when the temperature reached 50° C., thereto were added 21 parts of acrylonitrile, 0.5 part of benzoyl peroxide and 0.1 part of dicumyl peroxide. The temperature was further elevated to 80° C., and the mixture was subjected to polymerization reaction with stirring at 100 rpm while maintaining the temperature at 80° C. Six hours after the start of the reaction, the temperature of the mixture was elevated to 120° C. in 1 hour, and the mixture was subjected to reaction for a further 2 hours and then the reaction was terminated. The conversion was 97%.

The reaction mixture was cooled to 100° C., and thereto was added 0.2 part of 2,2'-methylene-bis-(4-methyl-6-tert-butylphenol). The mixture was taken out from the autoclave and subjected to steam distillation to remove the unreacted monomers and the solvent. The residue was finely ground and then passed through a 40-mm$\phi$ vented extruder (220° C, 700 mmHg) to remove the volatile matter and simultaneously effect pelletization, whereby a rubber-modified thermoplastic resin of this invention was obtained. The evaluation results of this resin are shown in Table 4.

EXAMPLES 14–23 AND COMPARATIVE EXAMPLES 12–13

The same procedure as in Example 13 was repeated, except that the rubber components and monomer components shown in Table 4 were used, to obtain rubber-modified thermoplastic resins. The evaluation results of these resins are shown in Table 4.

The rubber-modified thermoplastic resins of Examples 13–23 are those of this invention and, as compared with the resins of Comparative Examples 12–13, are superior in fatigue characteristics and well balanced in physical properties such as moldability, impact strength, mechanical strengths, appearance of molded article, fatigue characteristics and the like.

Comparative Example 12 is a case using, as the rubber component, a hydrogenated block copolymer which is outside the scope of this invention, wherein the B block is not a random copolymer and the C block is not a taper block. The resin of Comparative Example 13 is inferior in processability (MFR) and fatigue characteristics.

Comparative Example 13 is a case using, as the rubber component, an ethylene-propylene rubber which is outside the scope of this invention, and is inferior in moldability, appearance of molded article and fatigue characteristic.

The following Examples and Comparative Examples relate to transparent rubber-modified thermoplastic resins.

EXAMPLE 24

Into a 10-liter stainless steel autoclave provided with a paddle type agitator were fed 20 parts of the hydrogenated block copolymer a (shown in Table 3) having a refractive index of 1.507 which had beforehand been formed into a uniform solution, 11 parts of styrene, 100 parts of toluene and 0.1 part of tert-dodecylmercaptan. The mixture was heated to 50° C. with stirring, and thereto were added 64 parts of methyl methacrylate, 5 parts of acrylonitrile and 0.5 part of tert-butyl peroxyisopropyl carbonate. The autoclave inside was purged with nitrogen and the system temperature was elevated to 90° C. The polymerization was continued at that temperature with stirring at 100 rpm until the conversion reached 74%. When the conversion reached 74%, the polymerization was terminated. The subsequent procedure was effected in the same manner as in Example 13, to obtain a transparent rubber-modified thermoplastic resin. The evaluation results of this resin are shown in Table 5.

EXAMPLES 25–29 AND COMPARATIVE EXAMPLES 14–15

The same procedure as in Example 24 was repeated, except that the rubber components and monomer components shown in Table 5 were used, to obtain transparent rubber-modified thermoplastic resins.

The transparent rubber-modified thermoplastic resins of Examples 24–29 are those of this invention and, as compared with the resins of Comparative Examples 14–15, are superior in fatigue characteristics and well balanced in physical properties such as processability (MFR), impact resistance, mechanical strengths, appearance of molded article, transparency, fatigue characteristics and the like.

Meanwhile, Comparative Examples 14–15 are cases using, as the rubber component, a copolymer which is outside the scope of this invention. The resin of Comparative Example 14 is inferior in processability (MFR) and fatigue characteristics. The resin of Comparative Example 15 is inferior in moldability, appearance of molded article and fatigue characteristics.

TABLE 3

Rubber components (hydrogenated block copolymers) of rubber-modified thermoplastic resins

|  | Rubber component of Examples | | | | Rubber component of Comparative Examples | |
|---|---|---|---|---|---|---|
| No. of hydrogenated block copolymer | a | b | c | d | e | — |
| Block copolymer before hydrogenation | | | | | | |
| General formula | A-B-C | A-B-C | A-B | A-B | A-B-C (polybutadiene) | EP01[*1] |
| A block | | | | | | |
| Amount used (%) | 5 | 15 | 20 | 10 | 15 | — |
| Styrene content (%) | 100 | 100 | 100 | 100 | 100 | — |
| B block | | | | | | |
| Amount used (%) | 85 | 75 | 80 | 90 | 70 | — |
| Styrene content (%) | 23.5 | 6.7 | 12.5 | 22.2 | 0 | — |
| Butadiene content (%) | 76.5 | 93.3 | 87.5 | 77.8 | 100 | — |
| Vinyl configuration content (%) | 41 | 40 | 41 | 41 | 42 | — |
| C block | | | | | | |
| Amount used (%) | 10 | 10 | — | — | 15 | — |
| Styrene content (%) | 50 | 50 | — | — | 100 | — |
| Butadiene content (%) | 50 | 50 | — | — | 0 | — |
| Block copolymer | | | | | | |
| Styrene/butadiene (%) | 30/70 | 25/75 | 30/70 | 30/70 | 30/70 | — |
| Styrene content in A or (A + C) (%) | 10 | 20 | 20 | 20 | 30 | — |
| Number-average molecular weight ($\times 10^{-4}$) | 13 | 13 | 14 | 13 | 14 | — |
| Hydrogenated block copolymer Hydrogenation degree (%) | 98 | 98 | 98 | 98 | 98 | — |

Note:
[*1] Same as in Table 1.
[*2] A taper block wherein the styrene content increases gradually.

TABLE 4

Rubber-modified thermoplastic resins

|  | Example | | | | | | | |
|---|---|---|---|---|---|---|---|---|
|  | 13 | 14 | 15 | 16 | 17 | 18 | 19 | 20 |
| Composition of polymer | | | | | | | | |
| Rubber component | | | | | | | | |
| Hydrogenated block copolymer No. | a | a | a | a | b | a | c | c |
| Amount used (parts) | 30 | 30 | 30 | 30 | 30 | 30 | 30 | 30 |
| Amount of graft monomer used (parts) | | | | | | | | |
| Methyl methacrylate | — | — | — | 21 | — | — | — | — |
| Styrene | 49 | 49 | 49 | 35 | 49 | 70 | 49 | 49 |
| Acrylonitrile | 21 | 21 | 21 | 14 | 21 | — | 21 | 21 |
| Blend polymer | — | AS 30[*2] | AS 30[*2] | — | — | — | — | AS 30[*2] |
| General properties | | | | | | | | |
| MFR (g/10 min) | 25 | 30 | 30 | 25 | 25 | 45 | 30 | 34 |
| Izod impact strength (Kg · cm/cm) | 45 | 20 | 20 | 35 | 38 | 20 | 44 | 19 |
| Mechanical properties | | | | | | | | |
| Tensile strength (Kg/cm²) | | | | | | | | |
| Extrusion direction | 450 | 480 | 480 | 440 | 420 | 405 | 460 | 480 |
| Transverse direction | 435 | 460 | 460 | 430 | 405 | 380 | 420 | 460 |
| Falling weight impact strength | | | | | | | | |
| 23° C. | 350 | 250 | 250 | 310 | 340 | 260 | 370 | 250 |
| −30° C. | 250 | 160 | 160 | 150 | 230 | 100 | 260 | 170 |
| Appearance of molded article | | | | | | | | |
| Tintability | | | | | | | | |
| Black compound | 1.1 | 1.0 | 1.0 | 1.0 | 1.1 | 1.2 | 1.1 | 1.0 |
| Blue compound | ○ | ○ | ○ | ○ | ○ | ○ | ○ | ○ |
| Surface gloss | 90 | 91 | 91 | 91 | 89 | 86 | 89 | 90 |
| Weather resistance Retention of impact strength (%) | 87 | 88 | 88 | 88 | 87 | 81 | 88 | 88 |
| Fatigue characteristics | | | | | | | | |
| Number of repetitions up to breakage | | | | | | | | |
| Extrusion direction | 15000 | 10000 | 10000 | 10000 | 14000 | 11000 | 14000 | 10000 |
| Transverse direction | 8000 | 5000 | 5000 | 5500 | 7000 | 6000 | 7000 | 5000 |

|  | Example | | | Comparative Example | |
|---|---|---|---|---|---|
|  | 21 | 22 | 23 | 12 | 13 |
| Composition of polymer | | | | | |
| Rubber component | | | | | |
| Hydrogenated block copolymer No. | c | d | c | e | EP01[*1] |
| Amount used (parts) | 30 | 30 | 30 | 30 | 21 |
| Amount of graft monomer used (parts) | | | | | |

TABLE 4-continued

| Rubber-modified thermoplastic resins | | | | | | |
|---|---|---|---|---|---|---|
| Methyl methacrylate | 21 | — | — | — | — | |
| Styrene | 35 | 49 | 70 | 49 | 55 | |
| Acrylonitrile | 14 | 21 | — | 21 | 24 | |
| Blend polymer | — | — | — | — | — | |
| General properties | | | | | | |
| MFR (g/10 min) | 33 | 31 | 51 | 12 | 11 | |
| Izod impact strength (Kg · cm/cm) | 35 | 43 | 18 | 41 | 38 | |
| Mechanical properties | | | | | | |
| Tensile strength (Kg/cm$^2$) | | | | | | |
| Extrusion direction | 450 | 450 | 410 | 430 | 435 | |
| Transverse direction | 430 | 420 | 390 | 420 | 385 | |
| Falling weight impact strength | | | | | | |
| 23° C. | 300 | 360 | 270 | 320 | 330 | |
| −30° C. | 140 | 250 | 110 | 180 | 150 | |
| Appearance of molded article | | | | | | |
| Tintability | | | | | | |
| Black compound | 1.0 | 1.1 | 1.2 | 1.1 | 1.8 | |
| Blue compound | ○ | ○ | ○ | ○ | ○ | |
| Surface gloss | 91 | 89 | 87 | 88 | 80 | |
| Weather resistance | 89 | 87 | 80 | 88 | 85 | |
| Retention of impact strength (%) | | | | | | |
| Fatigue characteristics | | | | | | |
| Number of repetitions up to breakage | | | | | | |
| Extrusion direction | 10000 | 13500 | 10500 | 8000 | 5000 | |
| Transverse direction | 5500 | 7000 | 5500 | 3500 | 2000 | |

Note:
*[1] Same as in Table 1.
*[2] Same as in Table 2.

TABLE 5

Transparent rubber-modified thermoplastic resins

| | Example | | | | | | Comparative Example | |
|---|---|---|---|---|---|---|---|---|
| | 24 | 25 | 26 | 27 | 28 | 29 | 14 | 15 |
| Composition of thermoplastic resin | | | | | | | | |
| Rubber component | | | | | | | | |
| Hydrogenated block copolymer No. | a | a | b | c | c | d | e | EP01*[1] |
| Refractive index | 1.507 | 1.507 | 1.507 | 1.507 | 1.507 | 1.507 | 1.507 | 1.486 |
| Amount used (parts) | 20 | 20 | 20 | 20 | 20 | 20 | 20 | 20 |
| Graft monomer | | | | | | | | |
| Amount used (parts) Methyl methacrylate | 64 | 68 | 64 | 68 | 64 | 64 | 64 | 72 |
| Styrene | 11 | 12 | 11 | 12 | 11 | 11 | 11 | — |
| Acrylonitrile | 5 | — | 5 | — | 5 | 5 | 5 | 8 |
| Conversion | 75 | 75 | 75 | 75 | 75 | 75 | 75 | 75 |
| Refractive index of polymer | 1.5065 | 1.5065 | 1.5065 | 1.5065 | 1.5065 | 1.5065 | 1.5065 | 1.493 |
| Difference in refractive index between rubber and polymer | 0.0005 | 0.0005 | 0.0005 | 0.0005 | 0.0005 | 0.0005 | 0.0005 | 0.007 |
| General properties | | | | | | | | |
| MFR (g/10 min) | 35 | 25 | 33 | 28 | 41 | 39 | 15 | 14 |
| Izod impact strength (Kg · cm/cm) | 20 | 19 | 20 | 18 | 21 | 19 | 20 | 12 |
| Mechanical properties | | | | | | | | |
| Tensile strength (Kg/cm$^2$) | | | | | | | | |
| Extrusion direction | 440 | 430 | 415 | 425 | 445 | 430 | 420 | 405 |
| Transverse direction | 410 | 410 | 400 | 410 | 415 | 410 | 400 | 360 |
| Falling weight impact strength | | | | | | | | |
| 23° C. | 240 | 210 | 200 | 215 | 240 | 225 | 205 | 190 |
| −30° C. | 200 | 180 | 165 | 190 | 210 | 180 | 130 | 110 |
| Transparency | | | | | | | | |
| Total light transmittance | 91 | 90 | 91 | 91 | 90 | 91 | 91 | 78 |
| Haze | 5 | 5 | 5 | 5 | 6 | 6 | 5 | 23 |
| Appearance of molded article | | | | | | | | |
| Tintability | | | | | | | | |
| Black compound | 1.0 | 1.0 | 1.0 | 1.0 | 1.0 | 1.0 | 1.0 | 1.4 |
| Blue compound | ○ | ○ | ○ | ○ | ○ | ○ | ○ | Δ |
| Surface gloss | 91 | 90 | 91 | 91 | 90 | 91 | 91 | 85 |
| Weather resistance | 86 | 85 | 85 | 86 | 85 | 85 | 86 | 85 |
| Retention of impact strength (%) | | | | | | | | |
| Fatigue characteristics | | | | | | | | |
| Number of repetitions | | | | | | | | |

TABLE 5-continued

| | Transparent rubber-modified thermoplastic resins | | | | | | | |
|---|---|---|---|---|---|---|---|---|
| | Example | | | | | | Comparative Example | |
| | 24 | 25 | 26 | 27 | 28 | 29 | 14 | 15 |
| up to breakage | | | | | | | | |
| Extrusion direction | 10,500 | 9,500 | 9,050 | 9,000 | 9,500 | 9,000 | 6,000 | 6,000 |
| Transverse direction | 6,000 | 5,500 | 5,050 | 5,000 | 5,500 | 5,500 | 2,500 | 2,000 |

Note:
*[1]Same as in Table 1.

EXAMPLE 30

The same procedure as in the production of Base Rubber No. 1 was repeated, except that the amounts of styrene and 1,3-butadiene were changed to 150 g and 350 g, respectively, to obtain a hydrogenated diene random copolymer having a hydrogenation degree of 95%.

Using 25 parts of this hydrogenated diene random copolymer having a refractive index of 1.507, the same procedure as in Example 1 was repeated, except that the monomer mixture composition was changed to 7.8 parts of styrene, 10 parts of N-cyclohexylmaleimide (CHMI) and 57.2 parts of methyl methacrylate, to obtain a thermoplastic resin. The resin was evaluated and the results are shown in Table 6. The refractive index of the copolymer resin composed only of the monomer mixture was 1.5065.

COMPARATIVE EXAMPLES 16

Using 25 parts of a hydrogenated block copolymer KRATON G-1650 having a refractive index of 1.507, the same procedure as in Example 30 was repeated, except that the monomer mixture composition was changed to 8.9 parts of styrene, 1 part of N-cyclohexylmaleimide and 65.1 parts of methyl methacrylate, to obtain a thermoplastic resin. The resin was evaluated and the results are shown in Table 6. The refractive index of the copolymer resin composed only of the monomer mixture was 1.5049.

EXAMPLES 31

On 15 parts of the hydrogenated diene random copolymer of Example 30 were graft-polymerized 75 parts of methyl methacrylate and 10 parts of styrene in the same manner as in Example 1, to obtain a rubber-modified thermoplastic resin.

[Polyolefin compositions]

The rubber-modified thermoplastic resin obtained above and a polypropylene having a MFR of 25 g/10 min were kneaded according to the compounding recipes shown in Table 7, using a 50-mm$\phi$ extruder to prepare pellets. The pellets were passed through an injection molding machine (JS-80A manufactured by Toshiba) at 240° C. to prepare test pieces. The test pieces were measured for physical properties.

Chemical resistance

A constant strain (strain degree=1%) was applied to a test piece ($\frac{1}{8}$ × in. × $\frac{1}{2}$ in. × 5 in.). The deflected portion was coated with dioctyl phthalate (hereinafter referred to as DOP) or a brake fluid and allowed to stand at 23° C. until breakage (solvent crack) occurred. The time up to the breakage was measured and taken as a yardstick of chemical resistance.

The compounding recipe and physical properties of each polyolefin composition are shown in Table 7.

TABLE 7

| | Run No. | | | | |
|---|---|---|---|---|---|
| | 1 | 2 | 3 | 4 | 5 |
| Rubber-modified thermoplastic resin (parts) | 95 | 75 | 50 | 25 | 5 |
| Polypropylene (parts) | 5 | 25 | 50 | 70 | 95 |
| Physical properties | | | | | |
| Izod impact strength (kg · cm/cm) | 40 | 27 | 22 | 19 | 17 |
| Weather resistance (retention of Izod impact strength) | 94 | 96 | 96 | 95 | 97 |
| Solvent crack | | | | | |
| DOP (hrs) | ◯ | ◯ | ◯ | ◯ | ◯ |
| Brake fluid (hrs) | 18 | ◯ | ◯ | ◯ | ◯ |

Note:
"◯" denotes that the sample was in a good condition even after 50 hours or more.

EXAMPLES 32–35

Graft-polymerization was effected in an autoclave using 25 parts of the hydrogenated block copolymer a

TABLE 6

| | Base rubber | | | | Graft monomers | | | | |
|---|---|---|---|---|---|---|---|---|---|
| | Name | Type | Amount (parts) | Refractive index $n^{25}$ | MMA (parts) | ST (parts) | CHMI (parts) | Conversion (%) | Refractive index of polymer $n^{25}$ |
| Example 30 | Base Rubber No. 1 | Hydrogenated random SBR | 25 | 1.507 | 57.2 | 7.8 | 10 | 98 | 1.5065 |
| Comparative Example 16 | KRATON G-1650 | SEBS | 25 | 1.507 | 65.1 | 8.9 | 1 | 99 | 1.5049 |

| | Actual rubber amount (%) | Difference in refractive index between rubber and graft resin | Izod impact strength (kg · cm/cm) | Transparency | | Heat resistance (HDT) (°C.) | Weather resistance (retention of impact strength) (%) |
|---|---|---|---|---|---|---|---|
| | | | | T (%) | Hage (%) | | |
| Example 30 | 25.3 | 0.0005 | 12.5 | 87 | 4.2 | 100 | 92 |
| Comparative Example 16 | 25.1 | 0.0021 | 15.7 | 88.5 | 3.5 | 91 | 85 |

(refractive index=1.507) obtained in Example 13, 9 parts of styrene and 4 parts of acrylonitrile. When the conversion reached 95% or more, the polymerization was terminated. 0.2 part of 2,2'-methylene-bis-(4-methyl-6-tert-butylphenol) was added. The reaction mixture was taken out from the autoclave and subjected to steam stripping to remove the unreacted monomers and the solvent.

The residue (formed polymer) was finely ground, dried and then passed through a 40-mm$\phi$ vented extruder for pelletization, to obtain a graft copolymer (hereinafter referred to as G-1).

The hydrogenated diene polymer obtained in Example 30 was subjected to the same polymerization and post treatment as in the production of G-1 to obtain a graft copolymer (hereinafter referred to as G-2) which is a rubber-modified thermoplastic resin.

Preparation of polyamide elastomers

A-1: PEBAX 4011 MAOO (a product of Atochem Co.) was used.

A-2: PEBAX 5533 SAOO (a product of Atochem Co.) was used.

Preparation of functional group-containing modified vinyl polymers

S-1: A copolymer composed of 80 parts of methyl methacrylate, 11 parts of styrene, 4 parts of acrylonitrile and 5 parts of 2-hydroxyethyl methacrylate was prepared according to a conventional emulsion polymerization method.

S-2: A copolymer composed of 74 parts of styrene, 24 parts of acrylonitrile and 2 parts of maleic anhydride was prepared according to a conventional emulsion polymerization method.

The above components (A-1, A-2, G-1, G-2, S-1 and S-2) were mixed using a Henschel mixer according to the compounding recipes shown in Table 8.

Each of the resulting mixtures was melt-kneaded at 230° C. using a 50-mm$\phi$ twin-screw, vented extruder to prepare pellets. The pellets were measured for melt flow rate in accordance with JIS K 7210 (220° C., 10 kg).

The above pellets were subjected to injection molding at 230° C. using an injection molding machine IS-80A (a product of Toshiba Machine Co., Ltd.) to prepare test pieces. The test pieces were measured for Izod impact strength (ASTM D 256, ¼ in. notched, 23° C.) thermal distortion temperature (ASTM D 648, 18.6 kg/cm², ½ in.), flexural modulus of elasticity (ASTM D 790) and tensile strength (ASTM D 638, drawing speed=15 mm/min).

The above pellets were also treated by an injection molding machine (IS-25EP, a product of Toshiba Machine Co., Ltd.) at 230° C. to prepare a disc (diameter=100 mm, thickness=2 mm). The disc was molded at a relative humidity of 50% at an environmental temperature of 23° C. The molded article was subjected to 24-hour conditioning or to one-month standing and washing, and then measured for surface resistivity using an ultra-insulation resistance meter (4329A manufactured by Yokogawa-Hewlett Packard Co.).

The evaluation of weather resistance was made by placing a sample in a sunshine weatherometer using carbon arc as a light source, for 1,000 hours and then measuring the Izod impact strength of the resulting sample. At this time, the black panel temperature was 63°±3° C.

Using the test piece employed in the measurement of surface resistivity, the surface appearance was evaluated visually. The evaluation criteria were ○ (good), Δ (slightly poor) and X (very poor).

TABLE 8

| | Example | | | |
|---|---|---|---|---|
| | 32 | 33 | 34 | 35 |
| Compounding recipe (parts) | | | | |
| Polyamide elastomer | | | | |
| A-1 | 12 | — | 30 | 40 |
| A-2 | — | 60 | — | — |
| Rubber-modified thermoplastic resin | | | | |
| G-1 | 88 | — | 64 | — |
| G-2 | — | 40 | — | 30 |
| S-1 | — | — | 6 | — |
| S-2 | — | — | — | 30 |
| Proportions of components in composition (%) | | | | |
| Polyamide elastomer | 12 | 60 | 31.9 | 57.1 |
| Rubber-modified thermoplastic resin | 88 | 40 | 68.1 | 42.9 |
| Functional group-containing modified vinyl polymer | — | — | 6.4 | 42.9 |
| Properties | | | | |
| MFR (g/10 min) | 27 | 60 | 40 | 32 |
| Izod impact strength (Kg · cm/cm) | 12 | 60 | 40 | 80 |
| Heat distortion temperature (°C.) | 84 | 72 | 78 | 75 |
| Flexural modulus of elasticity (Kg/cm²) | 19,000 | 13,000 | 14,000 | 14,000 |
| Tensile strength (Kg/cm²) | 400 | 250 | 320 | 300 |
| Surface resistivity (After one day, Ω) | 1 × 10¹¹ | 5 × 10¹² | 1 × 10¹⁰ | 8 × 10⁹ |
| Surface resistivity (After one month of standing and subsequent washing, Ω) | 1 × 10¹¹ | 5 × 10¹² | 9 × 10⁹ | 7 × 10⁹ |
| Weather resistance (retention of Izod impact strength) (%) | 95 | 90 | 91 | 90 |
| Surface appearance | | | ○ | ○ |
| Transparency | | | | |
| Total light transmittance (%) | 83 | — | 75 | — |
| Haze (%) | 4 | — | 10 | — |

EXAMPLES 36–42

The rubber-modified resins G-1 to G-3 shown in Table 9 were mixed with a polyester block copolymer and/or a thermoplastic polyurethane according to the compounding recipes shown in Table 10, using a Henschel mixer.

Each of the resulting mixtures was melt-kneaded at 230° C. using a 50-mm$\phi$ twin-screw, vented extruder to prepare pellets. The pellets were measured for flexural modulus of elasticity (ASTM D 790) and tensile elongation (ASTM D 638, drawing speed=15 mm/min). The results are shown in Table 10.

Weather resistance was evaluated by retention of gloss. A molded article sample was subjected to accelerated weathering test using a sunshine weatherometer (black panel temperature=63° C., rainfall cycle=18 min per 120 min); the samples before and after the test were measured for gloss; and retention of gloss was calculated from the following equation:

Retention of gloss (%)=(Gloss after test)÷(gloss before test)×100

TABLE 9

| Rubber-modified resin | Hydrogenated diene copolymer (%) | | Proportion of each monomer and total proportion in rubber-modified resin (%) | |
|---|---|---|---|---|
| | Constituent (%) | Hydrogenation degree (%) | | |
| G-1 | Random copolymer of styrene (30)/butadiene (70) | (30) | 99 | Styrene (75)/acrylonitrile (25) | (70) |
| G-2 | Random block copolymer of polystyrene (10)/styrene (20)/butadiene (70) | (30) | 99 | Styrene (75)/acrylonitrile (25) | (70) |
| G-3 | Random block copolymer of polystyrene (10)/styrene (20)/butadiene (70) | (30) | 99 | Styrene (15)/acrylonitrile (5)/methyl methacrylate (80) | (70) |

TABLE 10

| | Example | | | | | | |
|---|---|---|---|---|---|---|---|
| | 36 | 37 | 38 | 39 | 40 | 41 | 42 |
| Compounding recipe (parts) | | | | | | | |
| Polyester block copolymer*1 | 30 | 50 | 70 | 50 | 50 | — | 25 |
| Thermoplastic polyurethane*2 | — | — | — | — | — | 50 | 25 |
| Rubber-modified thermoplastic resin | | | | | | | |
| Type | G-1 | G-1 | G-1 | G-2 | G-3 | G-4 | G-1 |
| Parts | 70 | 50 | 30 | 50 | 50 | 50 | 50 |
| Pigment | Black | Black | Black | Blue | Red | Black | Black |
| Physical properties | | | | | | | |
| Flexural modulus of elasticity (Kg/cm$^2$) | 14,000 | 9,000 | 4,000 | 9,000 | 9,000 | 9,000 | 9,000 |
| Tensile elongation (%) | 250 | 310 | 400 | 310 | 310 | 300 | 330 |
| Falling weight impact strength (Kg · cm) | 240 | 300 | 390 | 300 | 300 | 210 | 300 |
| Tintability | ○ | ○ | ○ | ○ | ○ | ○ | ○ |
| Weather resistance (%) | 88 | 85 | 84 | 84 | 84 | 86 | 84 |

Note:
*1 Pelprene P150M, a product of TOYOBO CO., LTD.
*2 Miractran E198, a product of Nippon Miractran Co., Ltd.

What is claimed is:

1. A thermoplastic resin composition comprising:
   (I) 1-99% by weight of a rubber-modified thermoplastic resin, and
   99-1% by weight of a transparent thermoplastic resin, a thermoplastic elastomer or combination thereof, provided that said resin (I) is excluded from component (II),
   wherein the rubber-modified thermoplastic resin (I) is a resin prepared by polymerizing (B) 30-100% by weight of at least one member selected from the group consisting of an aromatic alkenyl compound monomer and an alkyl (meth)acrylate monomer and (C) 70-0% by weight of at least one other monomeric compound copolymerizable therewith, in the presence of 5-45% by weight of (A) a hydrogenated diene copolymer of component (I) obtained by hydrogenating a diene copolymer comprising a random copolymer of 50% by weight or more of at least one conjugated diene and 50% by weight or less of an alkenyl aromatic compound until at least 70% by weight of the olefinic unsaturation of the diene copolymer is hydrogenated.

2. The composition according to claim 1, wherein the content of the hydrogenated diene copolymer (A) in the component (I) is 10-40% by weight and the difference in refractive index between the rubber-modified thermoplastic resin (I) and the transparent thermoplastic resin (II) is 0.01 or less.

3. The composition according of claim 1, wherein the component (II) is at least one member selected from the group consisting of polyolefins, styrene copolymers, rubber-modified styrene copolymers, polyamides, polyamide elastomers, polyesters, polyester elastomers and polyphenylene ethers.

4. The composition according to claim 1, wherein said component (II) is a polyolefin.

5. The composition according to claim 1, which comprises (I) 99-10% by weight of a rubber-modified thermoplastic resin, (II) 1-90% by weight of a polyamide elastomer and (III) 0-100 parts by weight, per 100 parts by weight of the components (I) and (II), of at least one member selected from a modified vinyl polymer and a rubbery modified vinyl copolymer having at least one functional group selected from the group consisting of a carboxyl group, an acid anhydride group, a hydroxyl group, an amino group and an epoxy group.

6. The composition according to claim 1, which comprises (I) 90-10% by weight of a rubber-modified thermoplastic resin and (II) 10-90% by weight of at least one thermoplastic elastomer selected from the group consisting of a polyester elastomer and a thermoplastic polyurethane.

7. The composition according to claim 1, wherein the component (B) is an alkyl (meth)acrylate, the homopolymer of which has a glass transition temperature of 50° C. or more and wherein the component (B) and the component (C) are copolymerized in such proportions that the difference in refractive index between the hydrogenated diene copolymer (A) and the copolymer of the (B) component and the (C) component becomes 0.01 or less.

8. The composition according to claim 1, wherein the component (C) is an N-substituted maleimide compound.

9. The composition according to claim 1, wherein the component (B) is a graft monomer mixture consisting of (1) 45-96% by weight of an alkyl (meth)acrylate compound, the homopolymer of which has a glass transition temperature of 50° C. or more, (2) 2-50% by weight of an N-substituted maleimide compound and (3) 53-2% by weight of another alkenyl monomer copolymerizable with (1) and (2).

10. The composition according to claim 9, wherein the proportions of the monomers (1), (2) and (3) are selected so that the difference in refractive index between the copolymer (A) and the copolymer obtained by polymerization of the graft monomer mixture per se becomes 0.01 or less.

11. The composition according to claim 1, wherein the hydrogenated diene copolymer (A) is a hydrogenated copolymer consisting of an A-B block copolymer or an A-B-C block copolymer in which A is an alkenyl aromatic compound polymer block, B is an alkenyl aromatic compound-conjugated diene random copolymer block, and C is a polymer block composed mainly of an alkenyl aromatic compound, wherein
  (i) the weight ratio of the alkenyl aromatic compound/the conjugated diene is 5–50/95–50,
  (ii) the total amount of the alkenyl aromatic compounds of the block A and the block C in the copolymer is 3–40% by weight, and
  (iii) the vinyl configuration content in the conjugated diene portion of the block B is 10–90%,
and wherein at least 90% of the double bonds of the conjugated diene is saturated.

12. The composition according to claim 1, wherein the rubber-modified thermoplastic resin (I) is a resin prepared by polymerizing (B) 30–100% by weight of at least one member selected from the group consisting of an aromatic alkenyl compound monomer and an alkyl (meth)acrylate monomer, the homopolymer of which has a glass transition temperature of 50° C. or more, and (C) 70–0% by weight of at least one other monomeric compound copolymerizable therewith, in the presence of (A) 5–45% by weight, based on the total weight of (A), (B) and (C), of a hydrogenated diene copolymer.

13. The composition according to claim 1, wherein the component (B) is an alkenyl aromatic compound monomer and the component (C) is an alkenyl cyanide compound monomer, and the proportion of the component (B) to the component (C) is 30–98/70–2 by weight.

14. The composition according to claim 13, wherein the proportion of the compound (B) to the component (C) is 40–95/60–5.

15. The composition according to claim 13, wherein the component (B) is styrene and the component (C) is acrylonitrile.

16. The composition according to claim 1, wherein the thermoplastic resin (II) is a resin prepared by polymerizing (B) 30–100% by weight of at least one member selected from the group consisting of an aromatic alkenyl compound monomer and an alkyl (meth)acrylate monomer and (C) 70–0% by weight of at least one other monomeric compound copolymerizable therewith.

17. The composition according to claim 16, wherein the component (C) is an N-substituted maleimide compound.

18. The composition according to claim 1, wherein the component (II) is a copolymer of (B) an aromatic alkenyl compound monomer and (C) at least one monomeric compound selected from the group consisting of alkenyl cyanide compounds and alkyl (meth)acrylates.

19. The composition according to claim 1, wherein the component (II) is a copolymer of (B) a (meth)acrylic acid ester monomer, the homopolymer of which has a glass transition temperature of 50° C. or more, and wherein the component (B) and the component (C) are copolymerized in such proportions that the difference in refractive index between the hydrogenated diene copolymer (A) and the component (II) becomes 0.01 or less.

20. The composition according to claim 1, wherein the transparent thermoplastic resin (II) is at least one member selected from the group consisting of methacrylic acid ester polymer, styrene-methyl methacrylate copolymer, styrene-methyl methacrylate-acrylonitrile copolymer, styrene-methylstyrene-methyl methacrylate-acrylonitrile copolymer, styrene-methyl methacrylate-maleimide copolymer styrenne-acrylonitrile copolymer.

* * * * *